US011170735B2

(12) United States Patent
Shim et al.

(10) Patent No.: US 11,170,735 B2
(45) Date of Patent: *Nov. 9, 2021

(54) DISPLAY DEVICE AND METHOD OF DRIVING THE SAME

(71) Applicant: SAMSUNG DISPLAY CO., LTD., Yongin-si (KR)

(72) Inventors: Byung Chang Shim, Yongin-si (KR); Hee Kwon Eun, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/869,803

(22) Filed: May 8, 2020

(65) Prior Publication Data

US 2020/0265801 A1  Aug. 20, 2020

Related U.S. Application Data

(63) Continuation of application No. 15/599,565, filed on May 19, 2017, now Pat. No. 10,685,625.

(30) Foreign Application Priority Data

May 30, 2016 (KR) .......................... 10-2016-0066639

(51) Int. Cl.
*G09G 5/12* (2006.01)
*G09G 5/00* (2006.01)
*H04N 5/57* (2006.01)
*H04N 5/58* (2006.01)
*H04N 21/442* (2011.01)
*G09G 5/36* (2006.01)

(52) U.S. Cl.
CPC ............. *G09G 5/12* (2013.01); *G09G 5/006* (2013.01); *G09G 5/363* (2013.01); *H04N 5/58* (2013.01); *H04N 21/44209* (2013.01); *G09G 2320/062* (2013.01); *G09G 2320/103* (2013.01); *G09G 2330/021* (2013.01); *G09G 2340/02* (2013.01); *G09G 2370/10* (2013.01)

(58) Field of Classification Search
CPC ...... H04N 5/58; H04N 5/57; G09G 2320/103; G09G 2320/021; G09G 2370/10; G03G 2330/021

See application file for complete search history.

(56) References Cited

U.S. PATENT DOCUMENTS

| 5,978,237 | A | 11/1999 | Savage | |
| 8,854,344 | B2* | 10/2014 | Glen | G09G 5/003 345/204 |
| 9,065,194 | B2 | 6/2015 | Suzuki et al. | |
| 9,165,518 | B2 | 10/2015 | Choi et al. | |
| 9,183,803 | B2* | 11/2015 | Jeong | G09G 3/3648 |

(Continued)

FOREIGN PATENT DOCUMENTS

KR  101158876 B1  6/2012

*Primary Examiner* — Brian P Yenke
(74) *Attorney, Agent, or Firm* — Cantor Colburn LLP

(57) ABSTRACT

A display device which supports a panel self refresh ("PSR") mode includes a source unit and a synchronizing unit, and a signal is transmitted between the source unit and the synchronizing unit through an interface. The source unit determines on/off of the PSR mode in response to a PSR setting value, and additionally determines whether to activate the PSR mode in response to luminance information.

14 Claims, 5 Drawing Sheets

(56) References Cited

U.S. PATENT DOCUMENTS

| | | |
|---|---|---|
| 9,390,666 B2 | 7/2016 | Oh et al. |
| 9,424,805 B2* | 8/2016 | Lee .................. G09G 5/003 |
| 9,478,191 B2 | 10/2016 | Lee et al. |
| 9,571,780 B2* | 2/2017 | Koo ................... H04N 5/63 |
| 9,620,064 B2* | 4/2017 | Albrecht ............ G09G 3/3406 |
| 9,622,326 B1 | 4/2017 | Devyver et al. |
| 9,672,792 B2 | 6/2017 | Choi et al. |
| 9,679,527 B2 | 6/2017 | Hwang et al. |
| 9,704,215 B2* | 7/2017 | Kim .................. G09G 5/006 |
| 9,747,826 B2 | 8/2017 | Lee et al. |
| 9,767,747 B2 | 9/2017 | Oh et al. |
| 9,865,194 B2 | 1/2018 | Koo et al. |
| 9,947,290 B2* | 4/2018 | Kang ................. G09G 5/006 |
| 9,972,260 B2* | 5/2018 | Onishi ................ G09G 3/20 |
| 9,972,264 B2* | 5/2018 | Onishi ................ G09G 3/3648 |
| 9,979,922 B2* | 5/2018 | Konishi .............. G09G 3/3655 |
| 10,049,629 B2 | 8/2018 | Oh et al. |
| 10,102,817 B2* | 10/2018 | Onishi ................ G09G 3/2092 |
| 10,115,376 B2 | 10/2018 | Yu et al. |
| 10,366,649 B2* | 7/2019 | Sung .................. G09G 3/2092 |
| 10,685,625 B2* | 6/2020 | Shim .................. G09G 5/006 |
| 2006/0123385 A1* | 6/2006 | Medvedev ........... G09G 5/00 717/100 |
| 2008/0013725 A1 | 1/2008 | Kobayashi |
| 2008/0150863 A1 | 6/2008 | Morisue et al. |
| 2008/0192030 A1 | 8/2008 | Yang et al. |
| 2009/0067810 A1* | 3/2009 | Hochberg ............ H04N 5/781 386/291 |
| 2009/0167791 A1* | 7/2009 | Shiomi ................ G09G 3/2092 345/691 |
| 2010/0156913 A1 | 6/2010 | Ortega et al. |
| 2011/0025680 A1 | 2/2011 | Kim et al. |
| 2012/0236013 A1* | 9/2012 | Wyatt .................. G06F 1/325 345/522 |
| 2013/0038621 A1 | 2/2013 | Choi et al. |
| 2013/0106876 A1 | 5/2013 | Lee et al. |
| 2013/0106895 A1 | 5/2013 | Jeong et al. |
| 2013/0201124 A1* | 8/2013 | Choi .................... G06F 3/0412 345/173 |
| 2013/0235055 A1 | 9/2013 | Kim et al. |
| 2013/0235941 A1 | 9/2013 | Koo et al. |
| 2013/0278614 A1 | 10/2013 | Sultenfuss et al. |
| 2014/0055476 A1* | 2/2014 | Wang .................. G06T 1/60 345/547 |
| 2014/0104259 A1 | 4/2014 | Oh et al. |
| 2014/0253537 A1* | 9/2014 | Lee .................... G09G 5/003 345/214 |
| 2014/0267448 A1 | 9/2014 | Albrecht et al. |
| 2015/0022747 A1 | 1/2015 | Hong et al. |
| 2015/0035819 A1 | 2/2015 | Kim et al. |
| 2015/0097527 A1 | 4/2015 | Dedona et al. |
| 2015/0116195 A1* | 4/2015 | Yokonuma ........... G09G 3/3611 345/102 |
| 2015/0116247 A1 | 4/2015 | Inoue et al. |
| 2015/0116266 A1 | 4/2015 | Inoue et al. |
| 2015/0187267 A1 | 7/2015 | Park et al. |
| 2015/0187308 A1 | 7/2015 | Shin et al. |
| 2015/0187334 A1 | 7/2015 | Oh et al. |
| 2015/0206502 A1 | 7/2015 | Hwang et al. |
| 2015/0221061 A1 | 8/2015 | Lee et al. |
| 2015/0301836 A1 | 10/2015 | Chung et al. |
| 2015/0316951 A1 | 11/2015 | An et al. |
| 2015/0339967 A1 | 11/2015 | Shin |
| 2015/0371609 A1 | 12/2015 | Choi et al. |
| 2015/0379947 A1 | 12/2015 | Sang et al. |
| 2016/0035297 A1 | 2/2016 | Oh et al. |
| 2016/0078798 A1* | 3/2016 | Watanabe ............ G09G 3/3648 345/690 |
| 2016/0078826 A1 | 3/2016 | Yoo et al. |
| 2016/0086557 A1* | 3/2016 | Watanabe ............ G09G 3/3618 345/691 |
| 2016/0117995 A1 | 4/2016 | Lee et al. |
| 2016/0125788 A1* | 5/2016 | Zhang ................. G09G 3/3406 345/596 |
| 2016/0322012 A1 | 11/2016 | Oh et al. |
| 2016/0370580 A1 | 12/2016 | Takada et al. |
| 2016/0372077 A1 | 12/2016 | Koo et al. |
| 2016/0379580 A1 | 12/2016 | Onishi et al. |
| 2016/0379583 A1 | 12/2016 | Onishi et al. |
| 2016/0379584 A1 | 12/2016 | Onishi et al. |
| 2017/0004789 A1 | 1/2017 | Takashimizu |
| 2017/0053580 A1 | 2/2017 | Chuang et al. |
| 2017/0053625 A1 | 2/2017 | Yu et al. |
| 2017/0076644 A1 | 3/2017 | Ahn et al. |
| 2017/0132987 A1 | 5/2017 | Kato |
| 2017/0256304 A1 | 9/2017 | Poornachandran et al. |
| 2017/0295343 A1* | 10/2017 | Konishi ............... G09G 3/3666 |
| 2017/0345395 A1 | 11/2017 | Shim et al. |
| 2018/0033378 A1* | 2/2018 | Li ....................... G09G 3/34 |
| 2018/0122300 A1 | 5/2018 | Jang |
| 2018/0308439 A1* | 10/2018 | Cheng ................. G09G 3/3618 |
| 2018/0374434 A1 | 12/2018 | Hao |
| 2019/0041956 A1* | 2/2019 | Yu ...................... G09G 3/3611 |
| 2020/0043440 A1* | 2/2020 | Qiu ..................... G06F 9/3877 |
| 2020/0175930 A1* | 6/2020 | Koo .................... G09G 3/3406 |

* cited by examiner

DISPLAY DEVICE AND METHOD OF DRIVING THE SAME

This application is a continuation of U.S. patent application Ser. No. 15/599,565, filed on May 19, 2017, which claims priority to Korean Patent Application No. 10-2016-0066639, filed on May 30, 2016, and all the benefits accruing therefrom under 35 U.S.C. § 119, the content of which in its entirety is herein incorporated by reference.

BACKGROUND

1. Field

Exemplary embodiments of the invention relate to a display device and a method of driving the same.

2. Description of the Related Art

Recently, video electronics standards association ("VESA") published a new version of an embedded display port ("eDP") standard. The eDP standard is an interface standard corresponding to a display port interface designed for devices, such as a notebook computer, a tablet personal computer ("PC"), a netbook computer, and an all-in-one desktop PC, including an embedded display device. Particularly, the eDP v1.3 includes panel self refresh ("PSR") technology.

The PSR technology may minimize power consumption by utilizing a memory embedded in a display device, and display an image as it is. Accordingly, there is an advantage in decreasing power consumption by the PSR technology.

SUMMARY

In a panel self refresh ("PSR") mode, a horizontal line or a flicker may be viewed at a beginning or an end of the PSR mode.

An exemplary embodiment of the invention provides a display device which supports a PSR mode and includes a source unit and a synchronizing unit, in which a signal is transmitted between the source unit and the synchronizing unit through an interface, and the source unit determines on/off of the PSR mode in response to a PSR setting value, and additionally determines whether to activate the PSR mode in response to luminance information.

In an exemplary embodiment, the source unit may include a PSR controller, which receives the luminance information, and generates a PSR control signal in response to the luminance information and the PSR setting value, and an embedded display port ("eDP") transmitting unit, which processes signals to be transmitted to the synchronizing unit in accordance with an eDP interface standard and transmits the processed signals to the synchronizing unit, and temporarily interrupts a signal transmission to the synchronizing unit during a duration of the PSR mode when the PSR control signal which instructs an activation of the PSR mode is input.

In an exemplary embodiment, the PSR controller may include a reference data storing unit, which stores a reference luminance value for determining whether to activate the PSR mode, a luminance detecting unit, which detects luminance of an image in response to the luminance information, and a control signal generating unit, which outputs the PSR control signal controlling the PSR mode to be activated when the detected luminance of the image is equal to or greater than the reference luminance value.

In an exemplary embodiment, the reference data storing unit may further store at least one of a reference temperature value and a specific user interface ("UI") list.

In an exemplary embodiment, the PSR controller may further receive at least one of temperature information and UI information, in addition to the luminance information, and generate the PSR control signal by reflecting at least one of the temperature information and the UI information.

In an exemplary embodiment, the source unit may further include a PSR mode selecting unit, which receives the PSR setting value, generate a selection signal corresponding to the PSR setting value, and transmit the generated selection signal to the PSR controller.

In an exemplary embodiment, the synchronizing unit may include an eDP receiving unit connected to the source unit through the interface, and a data storing unit, which stores image data transmitted from the source unit.

In an exemplary embodiment, the PSR setting value may be a PSR setting value by a user's input or a PSR initial setting value.

In an exemplary embodiment, the luminance information may include at least one of brightness information included in image data or a control signal and a screen brightness adjusting value.

In an exemplary embodiment, the source unit may additionally determine whether to activate the PSR mode in response to at least one of temperature information and UI information, in addition to the luminance information.

Another exemplary embodiment of the invention provides a method of driving a display device, in which a signal is transmitted between a source unit and a synchronizing unit through an interface, and which supports a panel self refresh ("PSR") mode, the method including receiving a PSR setting value, selecting on/off of the PSR mode in response to the PSR setting value, determining whether a PSR condition is satisfied when a PSR mode-on is selected, and activating the PSR mode when the PSR condition is satisfied, in which the PSR condition includes a luminance condition.

In an exemplary embodiment, the determining whether the PSR condition is satisfied may include determining that the PSR condition is satisfied when the luminance condition having a predetermined reference luminance value or greater is satisfied.

In an exemplary embodiment, when the PSR condition is not satisfied, the PSR mode may be inactivated, and whether to satisfy the PSR condition may be continuously monitored.

In an exemplary embodiment, the PSR condition may further include at least one of a temperature condition and a UI condition.

According to the exemplary embodiment, a PSR mode is selectively executed according to at least luminance information. Accordingly, a degradation of image quality is prevented while decreasing power consumption through the application of the PSR technology.

BRIEF DESCRIPTION OF THE DRAWINGS

Exemplary embodiments will now be described more fully hereinafter with reference to the accompanying drawings, in which.

DETAILED DESCRIPTION

Figure 1:
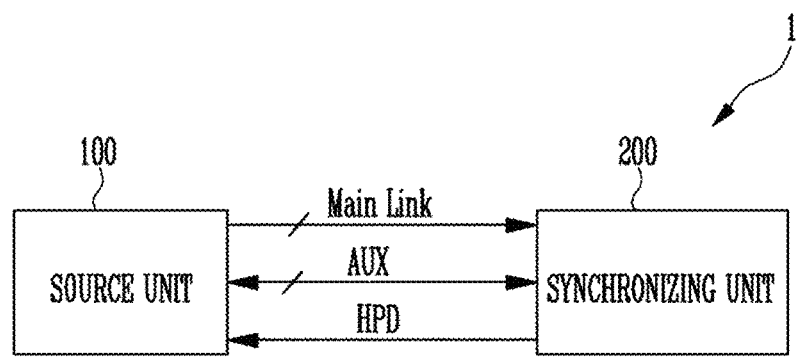
FIG. 1 illustrates an exemplary embodiment of a display device according to the invention.

Advantages and features of the invention and methods of achieving the advantages and features will be described with reference to exemplary embodiments described in detail below together with the accompanying drawings. However, the invention is not limited to the exemplary embodiments described herein, and may be implemented in various different forms. However, the exemplary embodiments described herein are provided so as to describe the invention in detail so that those skilled in the art may easily carry out the technical spirit of the invention.

Throughout this specification and the claims that follow, when it is described that an element is "coupled" to another element, the element may be "directly coupled" to the other element or "electrically coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

It will be understood that dimensions may be exaggerated for clarity of illustration. It will be understood that when an element is referred to as being "between" two elements, it can be the only element between the two elements, or one or more intervening elements may also be present. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular exemplary embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention and other matters desired for make those skilled in the art easily understand the contents of the invention will be described in detail with reference to the accompanying drawings. However, the exemplary embodiment described below is simply illustrative purposes regardless of an expression thereof. That is, the invention is not limited to the exemplary embodiment disclosed below, and may be changed into various forms and carried out.

Figure 2:
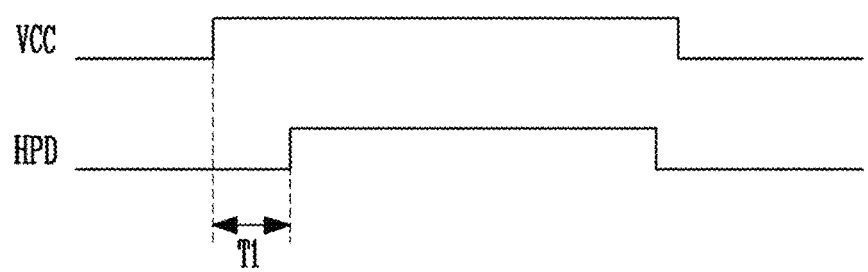
FIG. 2 illustrates a hot plug detect ("HPD") signal by an embedded display port ("eDP") interface scheme.

FIG. 1 illustrates a display device 1 according to an exemplary embodiment of the invention. Further, FIG. 2 illustrates a hot Plug detect ("HPD") signal by an embedded display port ("eDP") interface scheme.

Referring to FIG. 1, the display device 1 according to the exemplary embodiment of the invention includes a source unit 100 and a synchronizing unit 200. According to the exemplary embodiment, the source unit 100 and the synchronizing unit 200 communicate in the eDP interface scheme. To this end, a main link channel, an AUX channel, and an HPD channel may be provided between the source unit 100 and the synchronizing unit 200.

The source unit 100 is a system transmitting image data, and may include an eDP transmitting unit. In an exemplary embodiment, the source unit 100 may be a main board of a notebook computer including a graphic card or an application processor of a mobile device, for example.

The synchronizing unit 200 is a panel unit of the display device 1, and may include an eDP receiving unit. In an exemplary embodiment, the synchronizing unit 200 may be a panel unit of an organic light emitting display device or a liquid crystal display device, for example. The synchronizing unit 200 may include a timing controller including the eDP receiving unit, and a display unit driven by the timing controller.

The main link channel is used for transmitting image data. The AUX channel is used for transmitting various control signals desired for an environment setting and a control of the eDP interface scheme. The HPD channel is used for supplying an HPD signal. In an exemplary embodiment, in order to implement the channels including the main link channel, the AUX channel, and the HPD channel between the source unit 100 and the synchronizing unit 200, the source unit 100 may include a cable, for example.

A communication process between the source unit 100 and the synchronizing unit 200 will be described in more detail. As illustrated in FIG. 2, after a power signal VCC is input into the synchronizing unit 200, an HPD signal from the synchronizing unit 200 may be supplied to the source unit 100 after at least a first time T1. When the HPD signal is supplied from the synchronizing unit 200 to the source unit 100, the communication by the eDP interface scheme may be normally performed between the source unit 100 and the synchronizing unit 200. According to the exemplary embodiment, the first time T1 may be set with about 200 milliseconds (ms), for example.

The source unit 100 receiving the HPD signal from the synchronizing unit 200 may transmit various control signals to the synchronizing unit 200 by the AUX channel. Accordingly, the environment setting by the eDP interface scheme may be performed.

After the environment setting is completed, the source unit 100 transmits image data to the synchronizing unit 200 by the main link channel. Then, the synchronizing unit 200 displays an image corresponding to the image data through a display panel.

Figure 3:
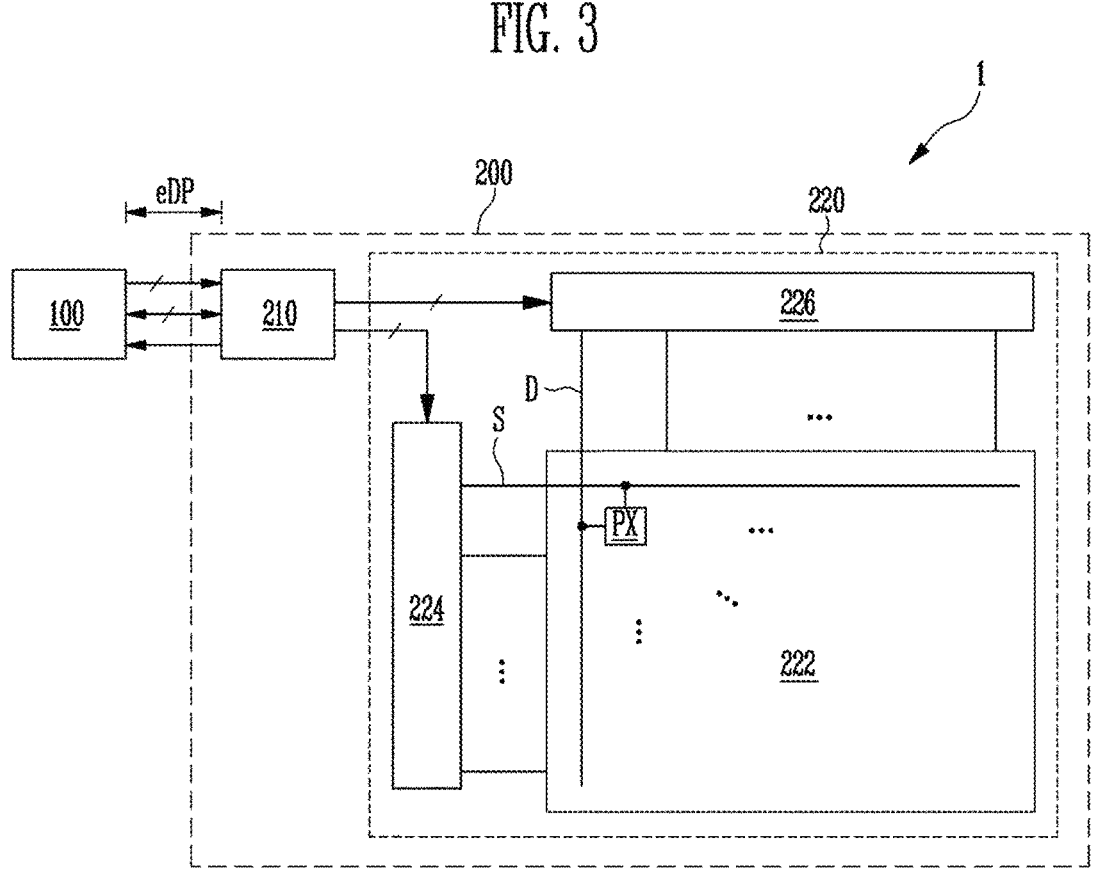
FIG. 3 illustrates an exemplary embodiment of a synchronizing unit in FIG. 1.

FIG. 3 illustrates an exemplary embodiment of the synchronizing unit in FIG. 1.

Referring to FIG. 3, the synchronizing unit 200 includes the timing controller 210 and the display unit 220. The synchronizing unit 200 receives various control signals and image data from the source unit 100 while communicating with the source unit 100 through the eDP interface.

The timing controller 210 receives a control signal desired for driving the display unit 220 and the image data from the source unit 100. To this end, the timing controller 210 may include the eDP receiving unit. The timing controller 210 realigns the image data and transmits the realigned image data to a data driver 226. Further, the timing controller 210 generates scan control signals and data control signals for controlling the driving of a scan driver 224 and the data driver 226, and supplies the generated scan control signals and data control signals to the scan driver 224 and the data driver 226, respectively.

The display unit 220 includes the display panel 222, the scan driver 224, and the data driver 226. For convenience of the description, FIG. 3 illustrates a case where the scan driver 224 and the data driver 226 are separated from the display panel 222, but the invention is not limited thereto. In another exemplary embodiment, at least one of the scan driver 224 and the data driver 226 may also be integrally integrated with the display panel 222, for example.

The display panel 222 includes a plurality of scan lines S, a plurality of data lines D, and a plurality of pixels PX connected to the scan lines S and the data lines D. The pixels PX are selected when a scan signal is supplied from the scan lines S and receives a data signal from the data lines D. The pixels PX emit light with luminance corresponding to the received data signal. When the display panel 222 is a self-emitting display panel, such as an organic light emitting display panel, each of the pixels PX emits light with luminance corresponding to the data signal. When the display panel 222 is a non-emissive display panel, such as a liquid crystal display panel, the display device 1 may further include a light source, such as a backlight unit (not illustrated). In this case, each of the pixels PX controls the quantity of transmissive light incident from the backlight unit in response to the data signal.

The scan driver 224 supplies a scan signal to the scan lines S in response to the scan control signals supplied from the timing controller 210. In an exemplary embodiment, the scan driver 224 may sequentially supply the scan signal to the scan lines S, for example. When the scan signal is supplied to the scan lines S, the pixels PX are selected in a unit of a horizontal line.

The data driver 226 generates a data signal by the data control signals and the image data supplied from the timing controller 210, and supplies the generated data signal to the data lines D so as to be synchronized with the scan signal. The data signal supplied to the data lines D is supplied to the pixels PX selected by the scan signal.

The display device 1 adopting the eDP interface scheme may support the PSR mode in order to decrease power consumption. In an exemplary embodiment, the display device 1 may enable a user to select an execution of the PSR mode in an environment setting menu, for example. A basic value (i.e., initial value) may be set so that the PSR mode is automatically mode-on or mode-off before a selection of the user is input.

In the case of the PSR mode-off, the source unit 100 continuously transmits various control signals and image data to the synchronizing unit 200 through the eDP interface. In an exemplary embodiment, the source unit 100 may transmit various control signals and image data to the timing controller 210 of the synchronizing unit 200 through the AUX channel and the main link channel for every frame, for example. Then, the timing controller 210 generates scan control signals and data control signals in response to the control signal from the source unit 100, and transmits the generated scan control signals and data control signals to the scan driver 224 and the data driver 226, respectively, and re-aligns the image data of each frame and transmits the realigned image data to the data driver 226. That is, in the state of the PSR mode-off state, real-time communication is established between the source unit 100 and the synchronizing unit 200, and an image is displayed on the display panel 222 in response to a result of the communication.

In the state of the PSR mode-on state, when a still image is input, the PSR mode may be activated. At a start time (i.e., the beginning) of the PSR mode, the source unit 100 transmits still image data to the timing controller 210 together with the control signal. According to the exemplary embodiment, the control signal may include a signal notifying a start of the PSR mode. Further, the transmitted still image data may be stored within the timing controller 210. Then, the transmission of the control signal and the image data from the source unit 100 to the synchronizing unit 200 is interrupted or stopped during the continuance of the PSR mode. During the period, the source unit 100 is in a standby state. In an exemplary embodiment, the source unit 100 may maintain a standby state, in which the source unit 100 receives only standby power, and the actual driving is stopped, for example. Accordingly, power consumption is decreased.

As described above, during the continuance of the PSR mode, the timing controller 210 may transmit the last stored image data (e.g., the last transmitted image data from the source unit 100 together with the start signal of the PSR mode) to the data driver 226 with a predetermined cycle, and drive the scan driver 224 and the data driver 226 according to the cycle. Accordingly, during the continuance of the PSR mode, the display panel 222 normally displays the still image while repeatedly reproducing the same image.

According to the exemplary embodiment, during the continuance of the PSR mode-on, the synchronizing unit 200 may be driven at the same driving frequency as that of the time of the PSR mode-off, or may be driven at a different driving frequency from that of the time of the PSR mode-off. In an exemplary embodiment, during the continuance of the PSR mode, the synchronizing unit 200 may be driven at a low speed compared to that of the case where the PSR mode is not executed, for example.

The PSR mode may be terminated when a selection signal (or a PSR setting value) instructing the PSR mode-off or video data is input. When the driving of the PSR mode is terminated, the source unit 100 resumes the transmission of the control signal and the image data to the synchronizing unit 200.

As described above, the display device 1 implements a PSR function, thereby effectively decreasing power consumption. However, when the PSR mode is applied in a lump by simply selecting only the on/off of the PSR mode without considering a characteristic of an image, such as brightness of an image, an issue of the image quality deterioration, such as a horizontal line or the flicker, may be generated. The reason of the image quality deterioration will be described below in more detail with reference to FIG. 4.

Figure 4:
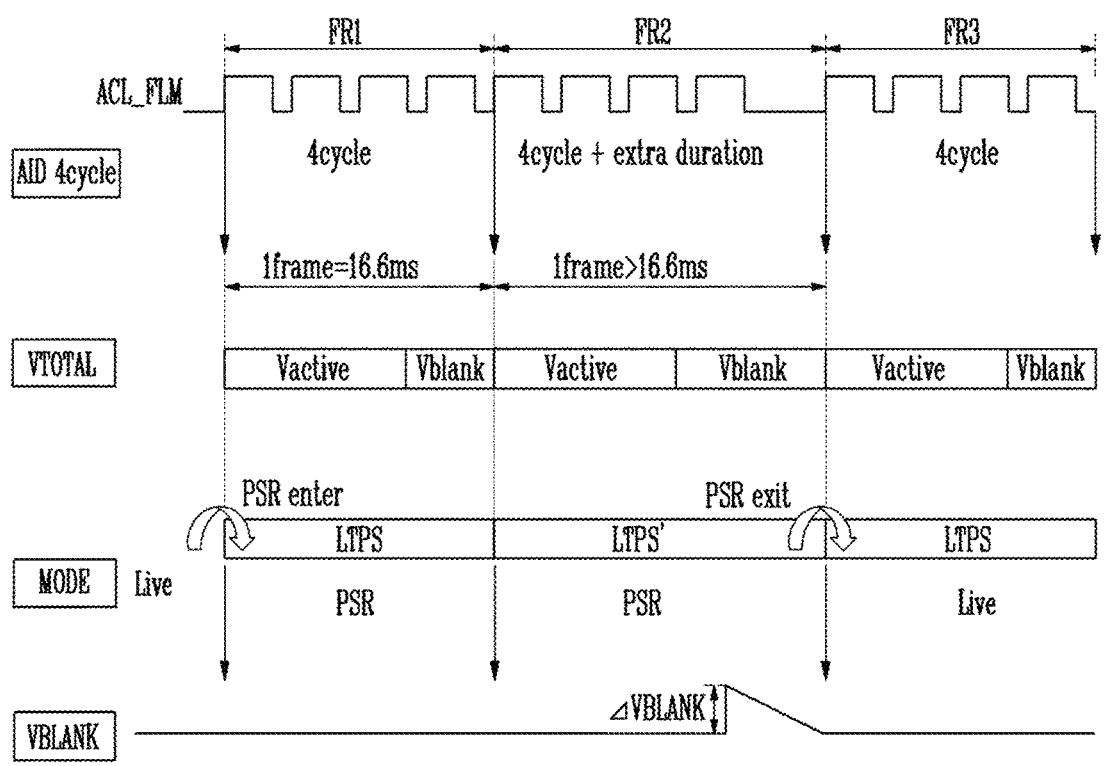
FIG. 4 is a waveform diagram for describing a reason of a generation of the image quality deterioration at a time of entrance to a panel self refresh ("PSR") mode or a termination time of the PSR mode in a display device supporting the PSR mode.

FIG. 4 is a waveform diagram for describing a reason of a generation of the image quality deterioration at a time of entrance to the PSR mode or a termination time of the PSR mode in the display device 1 (refer to FIGS. 1 and 3) supporting the PSR mode. According to the exemplary embodiment, in FIG. 4, a reason of the image quality deterioration will be described on an assumption that the PSR mode is applied in a lump in impulse driving an organic light emitting display device 1 (hereinafter, referred to as the active-matrix organic light-emitting diode impulse driving ("AID")) in a 4 cycle (or 4 duty cycle). However, the invention is not limited thereto, and the kind of display device 1 or a driving method of the display device 1 may be variously changed.

Referring to FIG. 4, in driving the organic light emitting display device 1, one frame may be divided into a plurality of sub frames and the organic light emitting display device 1 may be impulse-driven. When the AID is applied, the reason, such as bruising, color deviation, and/or a flicker, of the image quality deterioration, may be solved, thereby improving a display quality. In FIG. 4, ACL_FLM denotes a control signal controlling on/off of the impulse driving. In an exemplary embodiment, the ACL_FLM may be an emission control signal or a control signal used for generating an emission control signal, for example.

When the organic light emitting display device 1 is impulse-driven by the aforementioned method enters the PSR mode, a control signal and image data are transmitted from the source unit 100 (refer to FIGS. 1 and 3) to the synchronizing unit 200 (refer to FIGS. 1 and 3) at a time of the entrance to the PSR mode, for example, during a period of the first frame FR1 of the PSR mode. Then, the timing controller 210 stores the image data, and initially drives the display unit 220 by the control signal and the image data received from the source unit 100. Then, the timing controller 210 executes the PSR function in accordance with a duty cycle. In FIG. 4, LTPS denotes the control signals generated inside the synchronizing unit 200 in response to the control signal from the source unit 100, and may denote, for example, the scan control signals and the data control signals.

When the PSR mode continues even during a period of a second frame FR2 subsequent to the first frame FR1, the synchronizing unit 200 autonomously generates the control signals and repeatedly reproduces an image corresponding to the last stored image data during the period of the second frame FR2. In FIG. 4, LTPS' denotes the control signals which are autonomously generated inside the synchronizing unit 200, and the control signals may include, for example, the scan control signals and the data control signals generated inside the synchronizing unit 200 during the PSR period, during which the supply of the control signal from the source unit 100 is interrupted.

Then, when the second frame FR2 is terminated and the PSR mode is terminated, the transmission of the control signal and the image data from the source unit 100 to the synchronizing unit 200 is resumed. Then, during a period of a third frame FR3 subsequent to the second frame FR2, the synchronizing unit 200 is driven in response to the control signal and the image data supplied from the source unit 100.

However, during the execution of the PSR mode, the communication between the source unit 100 and the synchronizing unit 200 is interrupted, so that it is necessary to re-sync a driving timing of the source unit 100 and the synchronizing unit 200 at the termination time of the PSR mode. To this end, a length of a blank section Vblank of the second frame FR2 may be varied by a time desired for the re-sync. In FIG. 4, Vactive may denote an activation section, in which, for example, a scan signal is transmitted within the synchronizing unit 200, and Vblank may denote a blank section, in which the transmission of the scan signal and the like are interrupted. In the illustrated exemplary embodiment, VBLANK may denote a length of the blank section Vblank in each of the frames FR1, FR2, and FR3, and ΔVBLANK may denote a variation of a length of the blank section Vblank.

In an exemplary embodiment, the length of the blank section Vblank of the second frame FR2 may be longer than lengths of the blank sections Vblank of the first and third frames FR1 and FR3, for example. In this case, the period of the second frame FR2 may be longer than those of the first and third frames FR1 and FR3. In an exemplary embodiment, when each of the first and third frames FR1 and FR3 has a duration time of 16.6 ms, the second frame FR2 may have a longer duration time than 16.6 ms, for example.

Accordingly, an AID off ratio ("AOR") is changed, so that an on ratio of the pixels PX is changed (e.g., increased) by an increased length of the blank section Vblank at a time (i.e., a termination time of the PSR mode), at which the PSR mode-on is changed to the PSR mode-off, thereby incurring a luminance deviation. The luminance deviation may cause a generation of a horizontal line or the flicker. In addition, when the driving frequency is differently set at the on/off of the PSR mode, a luminance deviation may be generated by a switch of the driving frequency even at the time of the entrance to the PSR mode.

The image quality issue, such as a horizontal line or the flicker, may be magnified and recognized by a visual characteristic of a person, particularly, in a low luminance region (e.g., a low luminance AID dimming region). That is, when a horizontal line or the flicker is generated in the display device 1 in a low luminance region, a user visually feels a larger change. Accordingly, when the PSR mode is applied, the actual image quality deterioration may be generated in the low luminance region. In this respect, the invention provides the display device 1, which improves an image quality while decreasing power consumption by adopting the PSR technology, and a method of driving the same.

Figure 5:
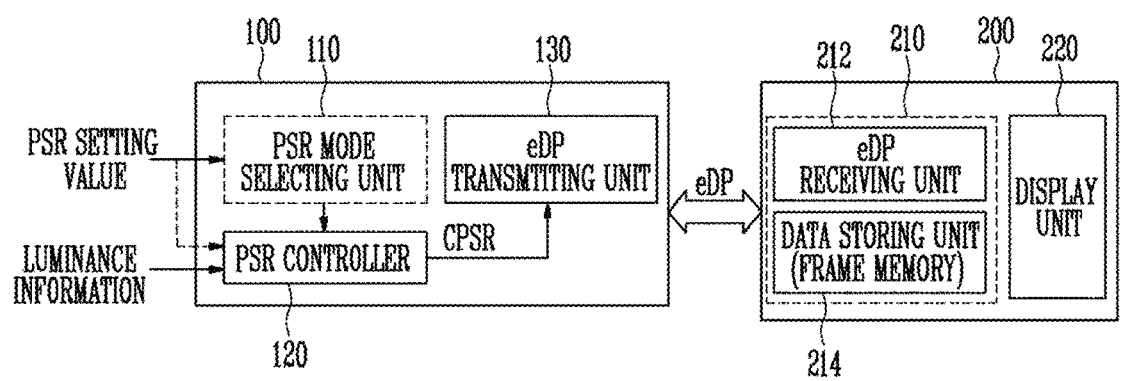
FIG. 5 illustrates an exemplary embodiment of a source unit and a timing controller according to the invention.

FIG. 5 illustrates a source unit and a timing controller according to an exemplary embodiment of the invention. Particularly, FIG. 5 illustrates an exemplary embodiment of the source unit 100 and the timing controller 210 included in a display device 1 (refer to FIGS. 1 and 3), in which a signal transmission is performed between the source unit 100 and a synchronizing unit 200 through an eDP interface, and which basically supports a PSR mode. In FIG. 5, the same reference numeral is assigned to the constituent element which is the same as or similar to the constituent element of FIGS. 1 and 3, and a detailed description thereof will be omitted.

Referring to FIG. 5, the source unit 100 according to the illustrated exemplary embodiment of the invention includes a PSR mode selecting unit 110, a PSR controller 120, and an eDP transmitting unit 130. However, the invention is not limited thereto, and in another exemplary embodiment, the PSR mode selecting unit 110 may be omitted.

The PSR mode selecting unit 110 receives a PSR setting value, and generates a selection signal corresponding to the PSR setting value. In an exemplary embodiment, the PSR setting value may be a PSR setting value by an input of the selection signal from a user, or a PSR initial setting value. The selection signal input by the user may be a selection signal instructing on or off of the PSR mode. The PSR initial setting value is a value which is initially set so that the PSR mode is automatically on or off before an input of the user, and may be, for example, a value instructing the PSR mode-on. However, the invention is not limited thereto, and in another exemplary embodiment, the PSR mode selecting unit 110 may also be omitted. When the PSR mode selecting unit 110 is omitted, the PSR setting value is directly input into the PSR controller 120.

The PSR controller 120 receives at least luminance information, and generates a PSR control signal CPSR corresponding to the luminance information together with the selection signal (or the PSR setting value) from the PSR mode selecting unit 110. According to the exemplary embodiment, the luminance information may include at least one of brightness information (e.g., a panel load value) included in image data or a control signal and a screen brightness adjusting value.

According to the exemplary embodiment, the PSR controller 120 may be driven when the selection signal (or the PSR setting value) from the PSR mode selecting unit 110 instructs the PSR mode-on, and may generate the PSR control signal CPSR which additionally determines whether to activate the PSR mode in correspondence to the luminance information.

In an exemplary embodiment, when the selection signal (or the PSR setting value) instructing the PSR mode-on is input, the PSR controller 120 detects luminance of an image which is to be displayed (or which is being displayed) on the display panel 222 based on the luminance information, and when the detected luminance is equal to or greater than a predetermined reference luminance value, the PSR controller 120 may output the PSR control signal CPSR activating the PSR mode, for example. In an exemplary embodiment, when the detected luminance is smaller than the predetermined reference luminance value, the PSR controller 120 may output the PSR control signal CPSR inactivating the PSR mode. That is, the PSR mode is actually activated when the selection signal (or the PSR setting value) instructing the PSR mode-on is input, and also when the luminance of the image desired which is to be displayed (or which is being displayed) is equal to or greater than the predetermined reference luminance value.

The eDP transmitting unit 130 processes signals to be transmitted to the synchronizing unit 200 in accordance with the standard of the eDP interface, and transmits the processed signals to the synchronizing unit 200. The eDP transmitting unit 130 temporarily stops the signal transmission to the synchronizing unit 200 during a duration of the PSR mode when a PSR control signal CPSR instructing the activation of the PSR mode is input. The eDP transmitting unit 130 resumes the communication with the synchronizing unit 200 when a PSR control signal CPSR instructing the inactivation of the PSR mode is input, and maintains the communication with the synchronizing unit 200 in a PSR mode-off state.

That is, the source unit 100 according to the exemplary embodiment of the invention primarily determines on/off of the PSR mode in response to the PSR setting value, and additionally determines whether to activate the PSR mode in response to luminance information.

The PSR mode may be applied when a still image is input. That is, basically, when still image data is input, the PSR mode may be executed. Accordingly, the source unit 100 may additionally include a still image detecting unit (not illustrated) for detecting a still image from image data.

The synchronizing unit 200 includes a timing controller 210 including an eDP receiving unit 212 and a data storing unit 214, and a display unit 220 driven by the timing controller 210.

The eDP receiving unit 212 corresponds to the eDP transmitting unit 130 and is connected with the eDP transmitting unit 130 through the eDP interface. The eDP receiving unit 212 receives the control signal and the image data output from the eDP transmitting unit 130 through the eDP interface. Further, the eDP receiving unit 212 may transmit a control signal notifying an application of a power signal to the synchronizing unit 200 through the eDP interface, or may also feed signals related to the PSR driving back to the eDP transmitting unit 130.

The data storing unit 214 stores the image data received from the source unit 100. The image data may be supplied to the data storing unit 214 from the eDP transmitting unit 130 via the eDP receiving unit 212. In an exemplary embodiment, the data storing unit 214 may be a frame memory storing image data of at least one frame. The image data stored in the data storing unit 214 may be maintained until new image data is input from the source unit 100. During a continuance period of the PSR mode, the synchronizing unit 200 may execute a PSR function while continuously displaying an image corresponding to the image data stored in the data storing unit 214.

As described above, in the exemplary embodiment of the invention, whether to activate of the PSR mode is determined based on luminance information together with a PSR setting value. Particularly, the PSR controller 120 according to the exemplary embodiment of the invention activates the PSR mode only in a high luminance region having a value equal to or greater than the predetermined luminance value (or a value greater than the predetermined luminance value) based on a predetermined reference luminance value. Accordingly, power consumption is decreased through the activation of the PSR mode in the high luminance region having large power consumption.

The PSR controller 120 according to the exemplary embodiment of the invention controls the PSR mode to be inactivated in a low luminance region having a value smaller than the predetermined luminance value (or having a value equal to or smaller than the predetermined luminance value). Accordingly, the deterioration, such as a horizontal line or the flicker, of an image quality generable when the PSR mode is applied in the low luminance region is prevented.

That is, according to the exemplary embodiment of the invention, the PSR mode is not simply on or off according to the PSR setting value, but the PSR mode is selectively executed according to a specific condition, particularly, at least the luminance of the image which is to be displayed (or which is being displayed) on the display unit 220. Accordingly, an image quality is improved while decreasing power consumption through the application of the PSR technology.

Figure 6:
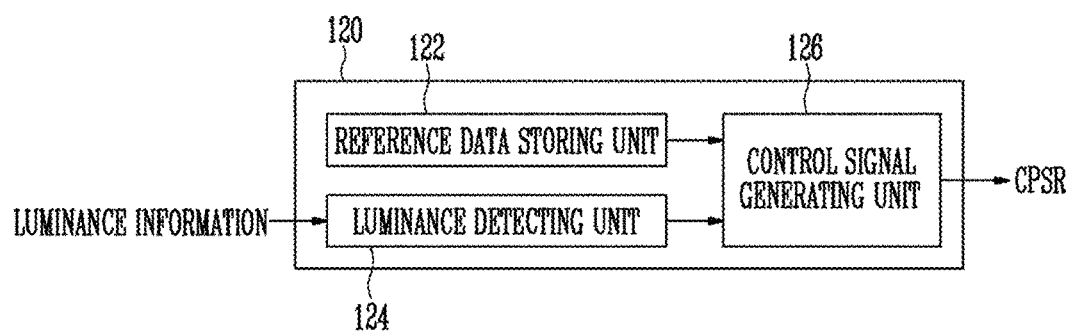
FIG. 6 illustrates an exemplary embodiment of a PSR controller in FIG. 5.
Figure 7:
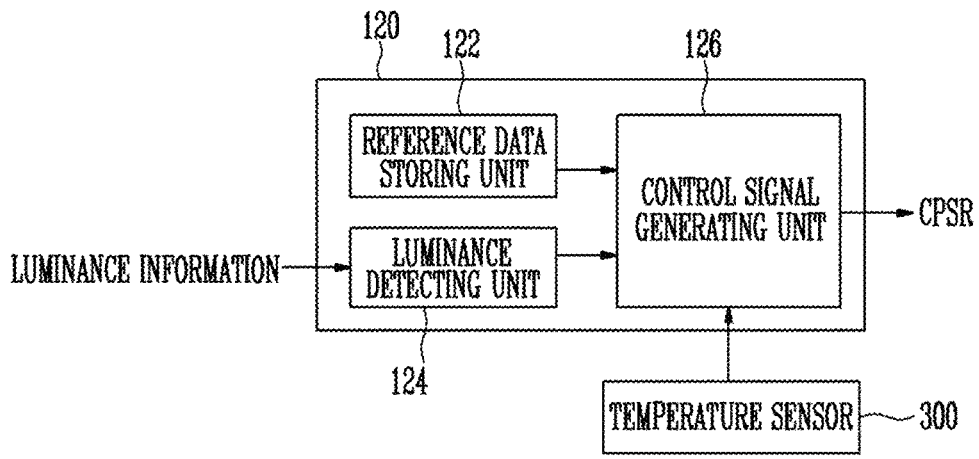
FIG. 7 illustrates another exemplary embodiment of a PSR controller in FIG. 5.

FIG. 6 illustrates an exemplary embodiment of the PSR controller in FIG. 5. Further, FIG. 7 illustrates another exemplary embodiment of the PSR controller in FIG. 5.

Referring to FIG. 6, the PSR controller 120 includes a reference data storing unit 122, a luminance detecting unit 124, and a control signal generating unit 126.

The reference data storing unit 122 stores reference data related to an additional condition (that is, an additional condition other than a PSR mode selection signal) for determining whether to activate the PSR mode. In an exemplary embodiment, the reference data storing unit 122 may store at least a reference luminance value, for example.

The luminance detecting unit 124 detects luminance of an image which is to be actually displayed (or which is being displayed) in response to the luminance information. In an exemplary embodiment, the luminance detecting unit 124 may receive at least one of brightness information (e.g., a panel load value) of an image included in the image data or the control signal, a screen brightness adjusting value (e.g. a brightness adjusting value set by a user), and information about an user interface ("UI") which is to be executed (or which is being executed), and detect luminance of the image in response to the received information, for example.

The control signal generating unit 126 compares a reference luminance value stored in the reference data storing unit 122 with the luminance of the image detected by the luminance detecting unit 124, and outputs a PSR control signal CPSR controlling the activation of the PSR mode according to the result of the comparison. In an exemplary embodiment, the control signal generating unit 126 may output a PSR control signal controlling the PSR mode to be activated when the luminance of the image detected by the luminance detecting unit 124 is equal to or greater than the reference luminance value, for example. The control signal generating unit 126 may output a PSR control signal CPSR controlling the PSR mode to be inactivated when the luminance of the image detected by the luminance detecting unit 124 is smaller than the reference luminance value.

The PSR controller 120 may determine whether to activate the PSR mode by additionally applying one or more conditions, in addition to the luminance condition. In an exemplary embodiment, the PSR controller 120 may further receive at least one of temperature information and UI information, in addition to the luminance information, and may additionally determine whether to activate the PSR mode by reflecting at least one of the temperature information and the UI information, for example. In this case, the reference data storing unit 122 may further store at least one of a reference temperature value and a specific UI list, in addition to the reference luminance value.

In an exemplary embodiment, when the UI information corresponding to the UI list stored in the reference data storing unit 122 is input, the control signal generating unit 126 may finally determine whether to activate the PSR mode in response to the input UI information, and then generate a PSR control signal CPSR, for example.

When the PSR controller 120 additionally determines whether to activate the PSR mode according to the temperature information, a temperature sensor 300 may be additionally provided in the display device 1 (refer to FIGS. 1 and 3) as illustrated in FIG. 7. In an exemplary embodiment, the control signal generating unit 126 may finally determine whether the activate the PSR mode by reflecting a current temperature detected by the temperature sensor 300, and then generate a PSR control signal CPSR, for example. The temperature sensor 300 may be provided in at least one of the source unit 100 and the synchronizing unit 200. Further, in an exemplary embodiment, the temperature sensor 300 may also be provided in a peripheral portion of the source unit 100 and/or the synchronizing unit 200.

Figure 8:
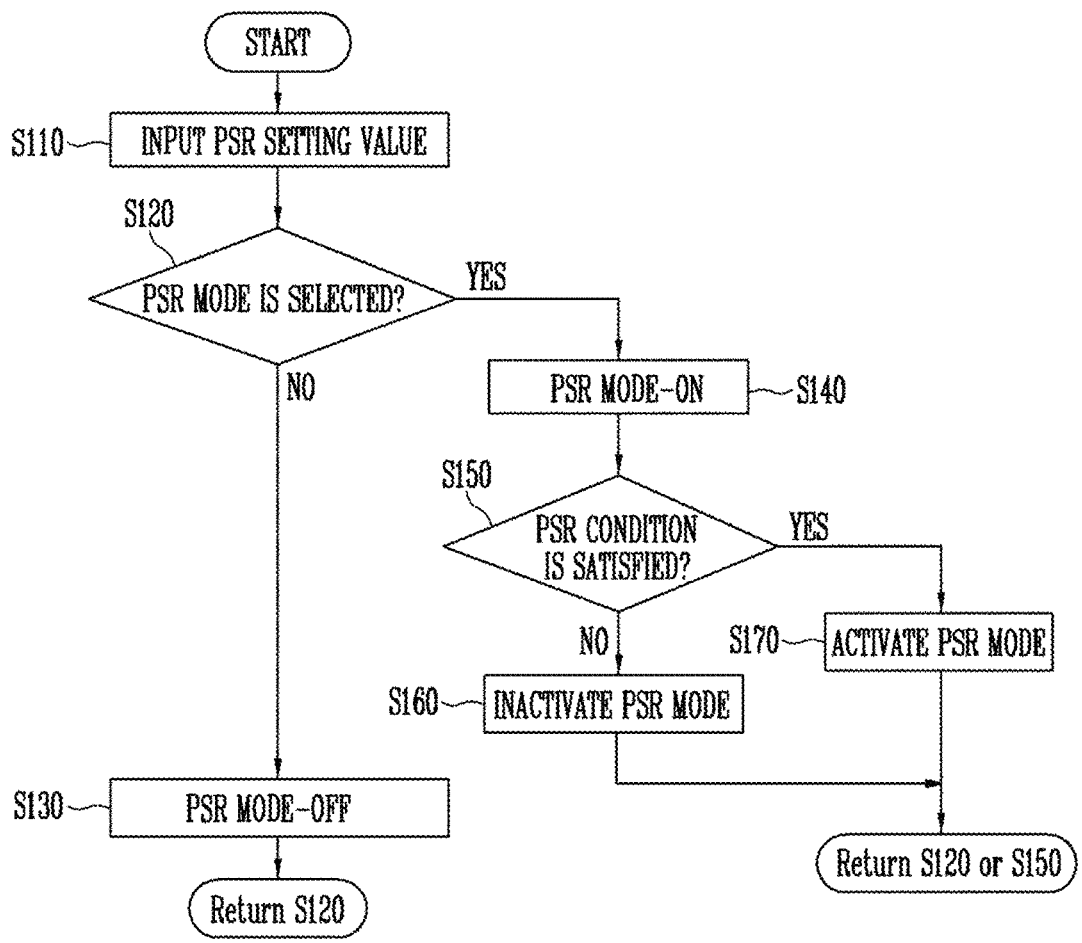
FIG. 8 is a flowchart for describing an exemplary embodiment of a method of driving the display device according to the invention.

FIG. 8 is a flowchart for describing a method of driving the display device 1 (refer to FIGS. 1 and 3) according to an exemplary embodiment of the invention. Particularly, a method of driving the display device 1, in which a signal transmission is performed between the source unit and the synchronizing unit through the eDP interface, and which basically supports a PSR mode, will be described with reference to FIG. 8.

Referring to FIG. 8, the method of driving the display device 1 according to the exemplary embodiment of the invention includes an operation of primarily selecting on/off of a PSR mode according to a PSR setting value, and an operation of additionally determining whether to activate the PSR mode by additionally checking whether a PSR condition is satisfied when a PSR mode-on is selected.

More particularly, when a PSR setting value is input, on/off of the PSR mode is selected in response to the PSR setting value (S110 and S120).

When the PSR mode-off is selected, the PSR mode is off (S130). In this case, the off state of the PSR mode may be maintained until a PSR setting value instructing the PSR mode-on is input.

When the PSR mode-on is selected, whether a predetermined PSR condition is satisfied (S150) is determined in a state where the PSR mode is primarily on (S140). The PSR condition includes at least a luminance condition. In an exemplary embodiment, when the luminance condition having a value equal to or greater than a predetermined reference luminance value is satisfied, it may be determined that the PSR condition is satisfied (S150), for example. Further, the PSR condition may further include a temperature condition or a UI condition, in addition to the luminance condition. In an exemplary embodiment, when a temperature condition having a predetermined reference temperature value or higher or UI information included in a specific UI list is input, it may be determined that the PSR condition is satisfied (S150), for example.

When the PSR condition is not satisfied, the PSR mode is inactivated (S160), and whether to satisfy the PSR condition is continuously monitored. When a PSR setting value instructing the PSR mode-off is newly input, the monitoring may be terminated.

When the PSR condition is satisfied, the PSR mode is activated (S170). When the PSR mode is activated, the PSR function is actually executed. When the PSR setting value instructing the PSR mode-off is newly input, or whether the satisfaction of the PSR condition is changed, the activated PSR mode may be terminated.

The technical spirit of the disclosure has been specifically described according to the preferred exemplary embodiments, but it is to be noted that the exemplary embodiments are provided for the description thereof and are not for the limitation thereof. Further, those skilled in the art will appreciate that various modifications may be made without departing from the scope and spirit of the disclosure.

What is claimed is:

1. A display device which supports a panel self refresh mode, the display device comprising:
    a source unit;
    wherein
    the source unit activates the panel self refresh mode if a panel self refresh condition is met,
    the panel self refresh condition includes whether a current image or an image to be displayed is a still image and has a luminance value equal to or greater than a predetermined reference luminance value, and
    the source unit does not activate the panel self refresh mode if the current image or the image to be displayed has a luminance value less than the predetermined reference luminance value.

2. The display device of claim 1, wherein the display device further comprising:
    a synchronizing unit,
    wherein
    a signal is transmitted between the source unit and the synchronizing unit though an interface.

3. The display device of claim 2, wherein the source unit activates the panel self refresh mode when the luminance is greater than the predetermined reference luminance value to prevent flicker phenomenon, which occurs if the panel self refresh mode is activated when the luminance is smaller than the predetermined reference luminance value, from being generated.

4. The display device of claim 3, wherein the source unit selects a panel self refresh mode-on in response to a panel self refresh setting value instructing the panel self refresh mode-on, and activates the panel self refresh mode if the panel self refresh condition is met during the panel self refresh mode-on.

5. The display device of claim 4, wherein the source unit includes:
    a panel self refresh controller, which receives the luminance value, and generates a panel self refresh control signal in response to the luminance value and the panel self refresh setting value; and
    an embedded display port transmitting unit, which processes signals to be transmitted to the synchronizing unit in accordance with an embedded display port interface standard and transmits the processed signals to the synchronizing unit, and temporarily interrupts a signal transmission to the synchronizing unit during duration of the panel self refresh mode when the panel self refresh control signal which instructs an activation of the panel self refresh mode is input.

6. The display device of claim 5, wherein the panel self refresh controller includes:
    a reference data storing unit, which stores the reference luminance value for determining whether to activate the panel self refresh mode;
    a luminance detecting unit, which detects luminance of an image in response to the luminance information; and
    a control signal generating unit, which outputs the panel self refresh control signal which controls the panel self refresh mode to be activated when the detected luminance of the image is equal to or greater than the reference luminance value.

7. The display device of claim 6, wherein the reference data storing unit further stores at least one of a reference temperature value and a specific user interface list.

8. The display device of claim 5, wherein the panel self refresh controller further receives at least one of temperature information and user interface information, in addition to the luminance value, and generates the panel self refresh control signal by reflecting at least one of the temperature information and the user interface information.

9. The display device of claim 5, wherein the source unit further includes a panel self refresh mode selecting unit, which receives the panel self refresh setting value, generates a selection signal corresponding to the panel self refresh setting value, and transmits the generated selection signal to the panel self refresh controller.

10. The display device of claim 4, wherein the panel self refresh setting value is a panel self refresh setting value by a user's input or a panel self refresh initial setting value.

11. The display device of claim 10, wherein the synchronizing unit includes:
    an embedded display port receiving unit connected to the source unit through the interface; and
    a data storing unit, which stores image data transmitted from the source unit.

12. The display device of claim 1, wherein the luminance value includes at least one of brightness information included in Image data or a control signal and a screen brightness adjusting value.

13. The display device of claim 1, wherein the source unit additionally determines whether to activate the panel self refresh mode in response to at least one of temperature information and user interface information, in addition to the luminance value.

14. A method of driving a display device which supports a panel self refresh mode and comprises a source unit, the method comprising:
    determining, by the source unit, whether a panel self refresh condition is satisfied; and
    based on determining that the panel self refresh condition is satisfied, activating, by the source unit, the panel self refresh mode, wherein determining whether the panel self refresh condition is satisfied includes determining, by the source unit, whether a current image or an image to be displayed is a still image and has a luminance value equal to or greater than a predetermined reference luminance value, and wherein the source unit does not activate the panel self refresh mode if the current image or the image to be displayed has a luminance value less than the predetermined reference luminance value.

* * * * *